(12) United States Patent
Kling et al.

(10) Patent No.: US 12,715,365 B2
(45) Date of Patent: Aug. 25, 2026

(54) SLIDING COVER FOR A CENTER CONSOLE OF A MOTOR VEHICLE

(71) Applicant: Dr. Ing. h.c. F. Porsche Aktiengesellschaft, Stuttgart (DE)

(72) Inventors: Achim Kling, Neuweiler-Agenbach (DE); David Ribaric, Cologne (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 384 days.

(21) Appl. No.: 18/388,316

(22) Filed: Nov. 9, 2023

(65) Prior Publication Data

US 2024/0157879 A1 May 16, 2024

(30) Foreign Application Priority Data

Nov. 10, 2022 (DE) .................... 10 2022 129 685.7

(51) Int. Cl.
*B60R 7/04* (2006.01)
*B60N 2/75* (2018.01)

(52) U.S. Cl.
CPC ................ *B60R 7/04* (2013.01); *B60N 2/773* (2018.02); *B60N 2/793* (2018.02)

(58) Field of Classification Search
CPC ... B60R 7/04; B60R 2011/0007; B60N 2/773; B60N 2/793; E05B 83/32; E05C 3/165
See application file for complete search history.

(56) References Cited

U.S. PATENT DOCUMENTS

| | | | | |
|---|---|---|---|---|
| 4,934,750 | A * | 6/1990 | Eichler | E05B 83/32 297/188.19 |
| 7,029,049 | B2 * | 4/2006 | Rockafellow | B60N 2/763 296/1.09 |
| 9,487,241 | B2 * | 11/2016 | Iriguchi | B62D 25/14 |
| 10,059,271 | B2 * | 8/2018 | Anderson | B60R 7/046 |
| 10,604,974 | B2 * | 3/2020 | Anderson | E05B 83/32 |
| 10,611,310 | B2 * | 4/2020 | Jones | E05B 83/32 |
| 2004/0080173 | A1 | 4/2004 | Niwa et al. | |
| 2014/0167435 | A1 * | 6/2014 | Sherburn | B60N 3/102 296/1.08 |
| 2016/0339848 | A1 * | 11/2016 | Hodgson | E05B 65/0876 |
| 2016/0340942 | A1 * | 11/2016 | Anderson | E05B 83/28 |

(Continued)

FOREIGN PATENT DOCUMENTS

| | | |
|---|---|---|
| FR | 2901514 | 11/2007 |
| JP | 4-31638 | 3/1992 |

(Continued)

*Primary Examiner* — Jason S Morrow
(74) *Attorney, Agent, or Firm* — LEYDIG, VOIT & MAYER, LTD.

(57) ABSTRACT

A sliding cover (2) for a center console (1) of a motor vehicle has a guide device (20) for sliding the sliding cover (2) in a guided manner. A holding element (5) holds the sliding cover (2) in one position. An actuating element (6) releases the holding element (5) by means of a release movement (10), and a deflecting device (11) transmits the release movement between the actuating element (6) and the holding element (5). The deflecting device (11) comprises a sliding element (2) and a rotating element (13) arranged on the sliding cover (2). The sliding cover (2) can be slid in a guided manner by means of the guide device (20) when the holding element (5) is released.

14 Claims, 6 Drawing Sheets

(56) References Cited

U.S. PATENT DOCUMENTS

2018/0304790 A1* 10/2018 Patil ...................... B60N 2/793
2020/0077794 A1 3/2020 Zimmermann

FOREIGN PATENT DOCUMENTS

KR 19980046835 9/1998
KR 20020045064 6/2002
KR 1020220055238 10/2022

* cited by examiner

SLIDING COVER FOR A CENTER CONSOLE OF A MOTOR VEHICLE

CROSS REFERENCE TO RELATED APPLICATION

This application claims priority on German Patent Application No 10 2022 129 685.7 filed Nov. 10, 2022, the entire disclosure of which is incorporated herein by reference.

BACKGROUND

Field of the Invention

The invention relates to a sliding cover for a center console of a motor vehicle, as well as to a center console with such a sliding cover for a motor vehicle.

Related Art

In the event of an accident or sudden decelerations, storage compartments in a motor vehicle should remain closed to prevent having parts flying around. Covers for storage compartments for center consoles are known in a multitude of variations. Center console storage compartments typically are closed by rolling shutter-type covers or hinged covers. Most of the time, however, rolling shutter-type covers do not have a locking mechanism. Hinged covers usually are hinged on one side and can be opened via a folding mechanism. The locking mechanism is arranged on the opposite side of the folding mechanism and generally operates mechanically. The covers are typically stationary and cannot be moved in the center console.

A device for opening and closing a center console box of a vehicle is known from KR 200 156 281 Y1, and KR 100 395 067 B1 describes a locking device of a center console box for a vehicle. Both devices comprise a locking mechanism on both sides of the center console box. However, the cover of the center console box is configured such that it is only hinged and cannot be moved.

Based on this, an object of the invention is to at least partially overcome the disadvantages known from the prior art. The features of the invention emerge from the claims. It is also possible to consult the explanations for this from the following description and from the figures that comprise additional configurations of the invention.

SUMMARY OF THE INVENTION

The invention relates to a sliding cover for a center console of a motor vehicle. The sliding cover comprises a guide device for sliding the sliding cover in a guided manner, a holding element for holding the sliding cover in one position, an actuating element for releasing the holding element by means of a release movement, and a deflecting device for transmitting the release movement between the actuating element and the holding element.

The center console of one embodiment is characterized in that the deflecting device comprises a sliding element and a rotating element arranged on the sliding cover, and the sliding cover can be slid in a guided manner by means of the guide device when the holding element is released.

Unless explicitly stated otherwise, ordinal numbers are used in the preceding and the following description only for the purposes of clear distinction and do not reflect any order or ranking of the designated components. An ordinal number greater than one does not imply that another such component has to necessarily be present.

The sliding cover comprises an at least partly closed base body. The base body of some embodiments comprises a lower part and an upper part. Due to the closed arrangement of the sliding cover, no objects laid down by the driver can damage or affect the components arranged in the sliding cover. The cover of some embodiments has at least two parts that can be preassembled prior to mounting in the motor vehicle to enable easy installation in the motor vehicle. The upper part of the sliding cover is in the field of view of the motor vehicle occupants, and desirably is made of visually appealing materials. Surfaces of the sliding cover that are handled by motor vehicle occupants are preferably made of haptically appealing materials. The sliding cover may be configured as a center armrest for a center console.

The base body may have openings for attaching the guide device to the sliding cover, or for the holding elements. The guide device of the sliding cover may be arranged on both sides and/or on the underside of the sliding cover. At least two guide devices may be provided for sliding the sliding cover in a guided manner to ensure precise guidance.

Some embodiments have an actuating element arranged on the cover for releasing the holding element by means of a release movement. The operating element may be positioned on the upper side or underside of the sliding cover. An actuating element on the upper side provides good visibility and operability and may be a grip bar. The actuating element on the sliding element cooperates with the rotating element to form the deflecting device. In one embodiment, the actuating element can be moved by the user, and the actuating element and the at least one sliding element preferably slide in the same direction. Displacement of the sliding device by the actuating device may be translational. Sliding in the same direction means that the sliding direction and the actuating direction are both in x-direction, i.e. along the x-axis of the motor vehicle, for example, but sliding can take place in negative direction and actuation can take place in positive x-direction. A stop may be fixed on the sliding cover to limit the movement. In one embodiment, the actuating element is a button, and the sliding cover can then be opened or closed by actuating this button, which may be a push button with an actuating direction in the z-direction.

Some embodiments have the rotating element of the deflecting device arranged on the sliding cover. The rotating element may be configured to rotate about a bearing bushing fixed to the sliding cover. Some embodiments have a head arranged on the bearing bushing to secure the rotating element and to prevent the rotating element from slipping off. The rotating element may comprise four lever arms. Two lever arms may be configured as driving lever arms for redirecting the movement of the sliding element into a rotational movement of the rotating element and two lever arms may be configured as holding element lever arms for transmitting the rotational movement into the release movement. The sliding element need not be fixed to the driving lever arms of the rotating element. Rather, the contact instead is created only when the sliding element is displaced. The sliding element and the holding element may have at least one depression, in which at least one lever arm engages. There is also no need to attach any connecting elements for connecting the lever arms to the respective component. This makes it possible to implement higher tolerances for the components.

The rotating element has to be rotated by a release angle to release the holding element. The angle of a rotation resulting from an inadvertent actuation of the actuating element is configured to be smaller than the release angle. Inadvertent contact with the actuating element does not lead to displacement of the sliding cover, so that unwanted opening is avoided. Moving the sliding cover requires a deliberate actuation that achieves a release angle so that the holding element of the sliding cover is released and can slide. The sliding cover is configured to be slid in a guided manner by the guide device when the holding element released.

The sliding element, the rotating element and the holding arms are preferably made at least in part of a plastic material. This primarily provides advantages in terms of weight and makes it easier to adapt the shape of the components to the respective load.

The sliding cover of some embodiments is configured to be displaced translationally by means of the guide device. A translational displacement has the advantage that there is no need to use complex guide devices for the guided displacement. In the case of a translational displacement, the sliding cover is configured to be slid in the x-direction of the motor vehicle. Thus, the opening of the sliding cover is intuitive and user-friendly for the user.

The sliding direction of the sliding cover and the movement direction of the actuating element may be the same.

The actuating element may be actuated by pulling and/or pushing. A conventional cover typically has to first be unlocked by pushing or pulling a lever or a button and can only then be moved. The movement to unlock such a cover is not in the same direction as the opening movement. Configuring the displacement of the sliding cover and the movement of the actuating element in the same direction makes it possible to simplify the unlocking process and the opening process of the sliding cover.

In one embodiment, the sliding cover has two sliding directions and the actuating element has an actuating direction that is the same as the sliding direction. This embodiment has two sliding directions, preferably in or against the x-direction of the motor vehicle. When the actuating element is moved, for example, in the x-direction of the motor vehicle, the movement of the sliding cover is in the same direction, i.e. also in the x-direction of the motor vehicle. This has the advantage that when the actuating element is actuated, the holding element is released, and the sliding cover can be slid in the same direction, so that operation is easy because displacement takes place in the actuating direction.

In one embodiment, at least one energy storage arrangement is provided for returning the holding element from the released position to the holding position. The energy storage arrangement may be positioned on the sliding cover and on the actuating element and/or at least one holding element. Arrangement of the energy storage arrangement on the sliding cover and on the sliding element and/or the deflecting device is possible as well. The energy storage arrangement may be a spring or rubber block that is tensioned by moving the actuating element. After actuation, the holding element is returned from the at least partly released position to the holding position. Arrangement of at least one energy storage arrangement makes it possible to implement resetting the holding element in a simple manner. After actuation, the sliding cover is placed automatically placed in a holding state by means of the energy storage arrangement.

The actuating element of one embodiment is configured to be rotated to release the holding element.

The actuating element of some embodiments is a rotary button, and the axis of rotation of the actuating element is aligned in the y-direction, i.e. parallel to the y-axis of the motor vehicle.

The sliding element need not be fixed to the actuating element. Instead, the contact may be created by a driver. The driver may be configured to transmit the rotational movement of the actuating element to the sliding element. This makes it possible to implement high manufacturing tolerances during assembly and also eliminates the need to install connecting elements. The sliding element may be a push rod. The actuating element may be on the head side of the underside of the sliding cover and can be actuated by the user intuitively and without much effort with a gripping motion. The sliding cover with the actuating element may be configured as a center armrest, because the actuating element does not affect the placing of an arm. The actuating element is moreover may be configured so as not to be visible to the motor vehicle occupants sitting in the seats of the motor vehicle. An arrangement on the underside can be visually more appealing. The connection of the sliding element and the rotating element can created by a ball head.

The invention also relates to a center console for a motor vehicle. The center console comprises at least one storage compartment with at least one guide rail and at least one sliding cover as described above. At least one of the sliding covers is guided in at least one of the guide rails by means of the guide device, and the at least one storage compartment is configured to be closed at least partly by at least one of the sliding covers.

The center console of a motor vehicle may have at least one storage compartment under at least one sliding cover and the sliding cover is configured to at least partly close the storage compartment.

The storage compartment may have further functions, in particular a device for charging electrical devices and/or a holder for drinking vessels. The storage compartment comprises at least one guide rail for sliding the sliding cover in a guided manner. The guide rail of the storage compartment may be configured so as not to be visible to the user in the closed state. The sliding cover of the storage compartment may be a center armrest for the center console. The storage compartment may have guide rails arranged on both sides. This has the advantage that the sliding cover is guided precisely and securely.

A blocking arrangement for the respective holding element may be configured on at least two positions of the at least one guide rail.

The sliding cover is configured to securely store objects in the event of an accident or in the event of sudden decelerations. Blocking arrangements, preferably in the form of mechanical locking mechanisms, may be configured on at least two positions. The mechanical locking mechanism may be configured as a catch in which the at least one holding element engages. This ensures reliable and precise locking. The engagement may be acoustically perceptible to provide the user with audible feedback of successful locking. A first position may securely lock the sliding cover in the closed state and a second position may securely lock the sliding cover in the open state.

The at least one holding element may be configured to hold the sliding cover outside the at least two blocking arrangements by means of static friction. The sliding cover therefore does not move in the guide rail even if it is not engaged in one of the blocking arrangements. This is advantageous when accelerating or decelerating or when driving on a bumpy road surface.

One embodiment of the center console may have at least one rotary brake arranged on the at least one sliding cover and/or the at least one guide rail for slowing down the at least one sliding cover. To carry out its function, the rotary brake may comprises gears. The at least one rotary brake is configured to adjust the amount of force required when the holding element is released. This makes it possible to set a comfortable amount of force to move the sliding cover for the user.

One embodiment of the center console has a first sliding cover configured to at least partly close the at least one storage compartment, and a second sliding cover configured as a center armrest and to at least partly close a storage compartment.

The center console may comprises a first sliding cover that is configured to at least partly close the at least one storage compartment and a second sliding cover that is configured as a center armrest and/or to at least partly close a storage compartment. The separation of the two sliding covers enables secure closing and positioning of a slidable center armrest independently of one another. The center armrest can be positioned as desired by the vehicle occupants independently of closing the storage compartment. A second storage compartment may be underneath the second sliding cover. The center armrest can also be arranged above the first sliding cover.

In one embodiment at least one energy storage arrangement is arranged on the sliding cover and the center console for opening or closing the sliding cover. The energy storage arrangement may comprise a roller and a belt that is wound on the roller in the unactuated state. During opening, the belt may be wound onto the roller and the energy storage arrangement is tensioned. During closing, the belt is unwound from the roller and the energy storage arrangement is relaxed. The winding during opening and closing can also be reversed. As a result of a single actuation of the actuating element configured as a button, the sliding cover then is opened or closed automatically with the aid of the pretensioning of the energy storage arrangement.

The above-described invention is discussed in detail in the following in the context of the relevant technical background with reference to the accompanying drawings which show preferred configurations. The invention is not limited in any way by the purely schematic drawings, wherein it should be noted that the drawings are not true to scale and are not suitable for defining dimensional relationships.

DETAILED DESCRIPTION

Figure 1:
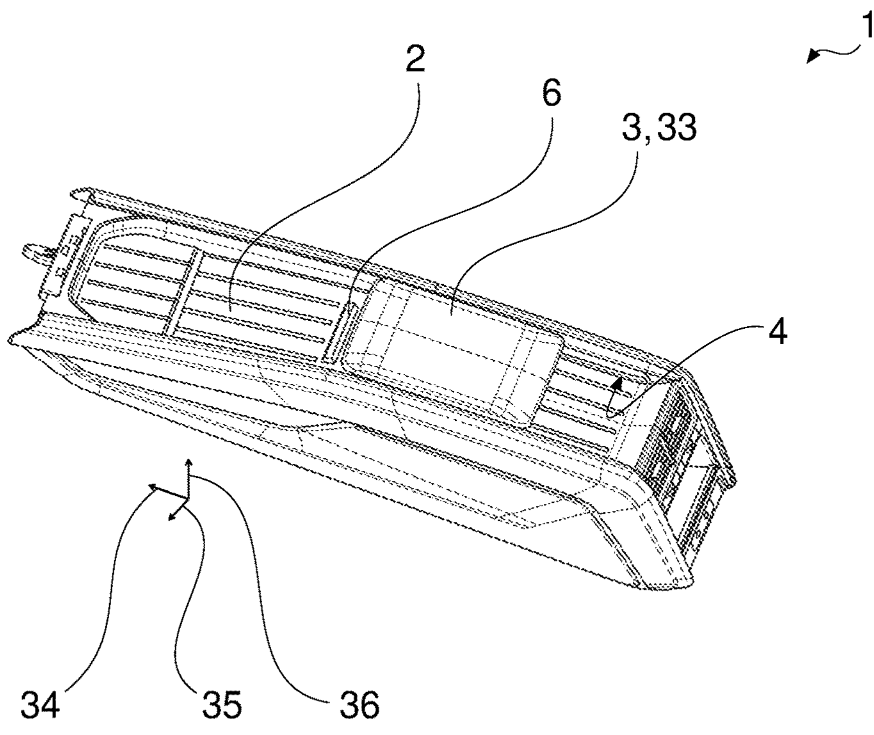
FIG. 1 is a perspective illustration of a center console.
Figure 11:
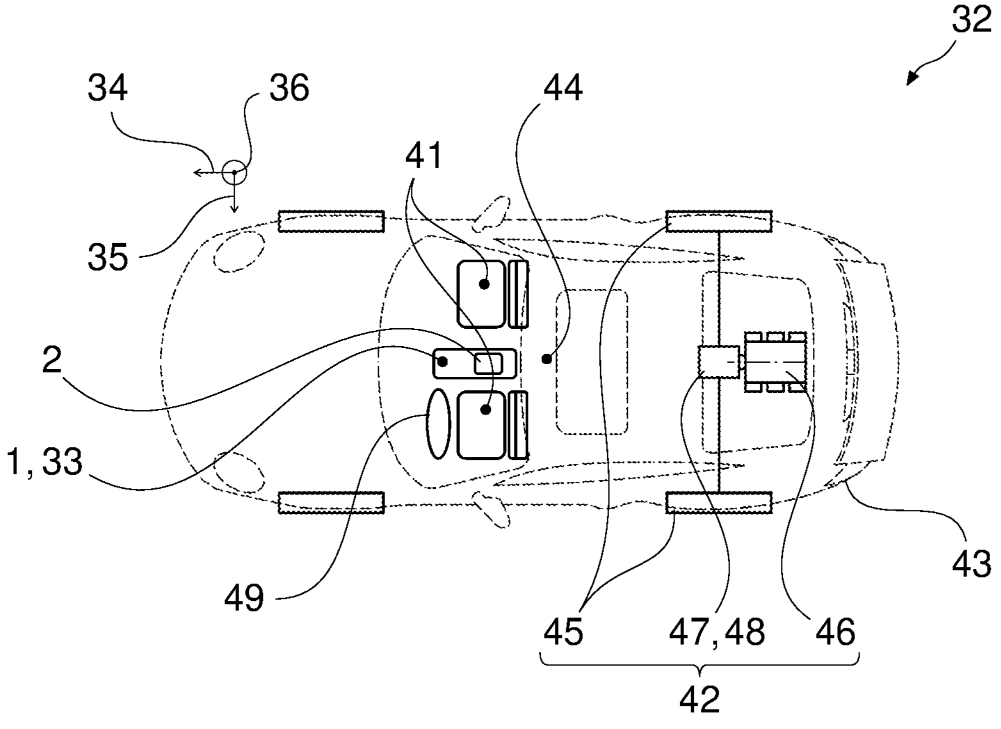
FIG. 11 is a motor vehicle with a center console in a schematic plan view.

FIG. 1 is a perspective illustration of a center console 1 where the longitudinal direction of the center console 1 is parallel to the longitudinal extension of the direction of x-axis 34 of the motor vehicle 32 shown in FIG. 11 and transverse to the direction of y-axis 35 and the vertical direction or z-axis 36. In this embodiment, the center console 1 comprises two sliding covers 2, 3, in each has an actuating element 6. The actuating element 6 of the first sliding cover 2 is configured as a grip bar. The two sliding covers 2, 3 are shown in FIG. 1 in the closed state. The second sliding cover 3 is configured as a center armrest 33. Guide rails 4 are arranged in each case on both sides for sliding the two sliding covers 2, 3 in a guided manner. The guide rails 4 of the first sliding cover 2 are visible only in the open state, whereas the guide rails 4 of the second sliding cover 3 are visible in the closed state as well.

Figure 2:
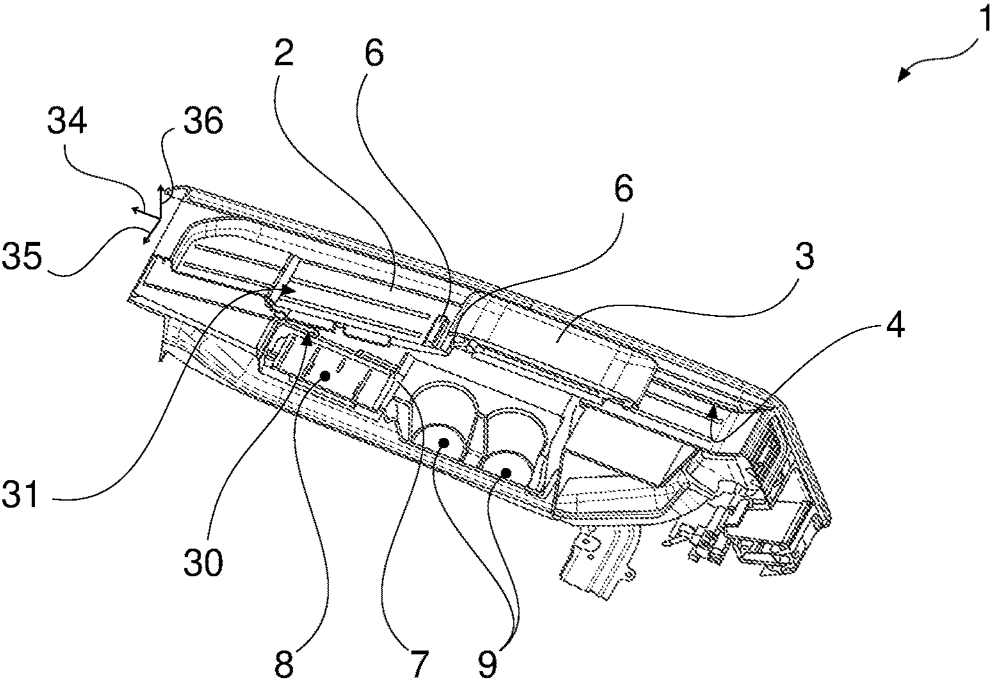
FIG. 2 is a sectional view of the center console of FIG. 1.

FIG. 2 is a sectional view of the center console 1 of FIG. 1. The two sliding covers 2, 3 are shown in the closed state here in FIG. 2 and close a storage compartment 7. A device 8 for charging a cell phone is arranged underneath the first sliding cover 2. A holder 9 for drinking vessels is arranged underneath the second sliding cover 3. The actuating element 6 of the second sliding cover 3 is configured as a rotary button. The base body of the sliding cover 2, 3 comprises a lower part 30 and an upper part 31.

Figure 3:
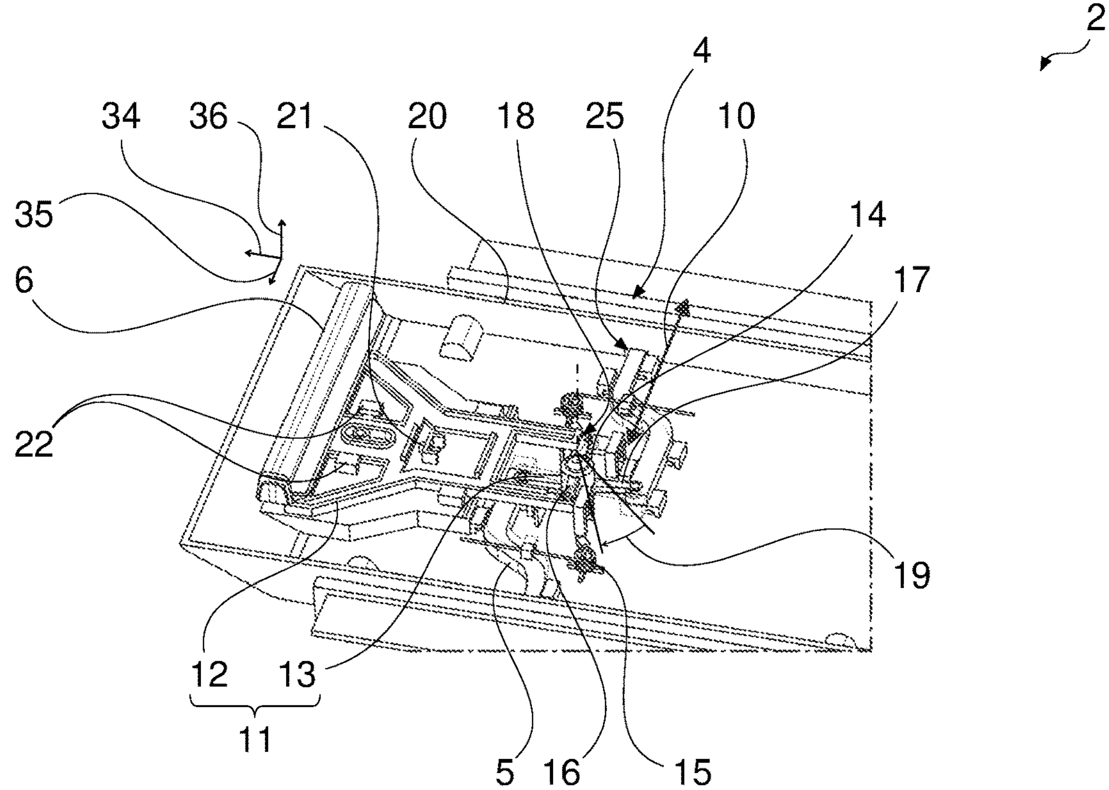
FIG. 3 is a perspective illustration of a sliding cover according to a first embodiment with the upper part hidden.

FIG. 3 is a perspective illustration of a first sliding cover 2 according to a first embodiment, for example as shown in FIGS. 1 and 2, with the upper part 31 hidden. The first sliding cover 2 is guided on both sides in guide rails 4. The base body of the sliding cover 2 comprises openings 25, through which the holding elements 5 pass.

An actuating element 6 configured as a grip bar is arranged at the upper side of the sliding cover 2 for releasing two holding elements 5 by means of a release movement 10. A deflecting device 11 is provided for transmitting the release movement 10 between the actuating element 6 and the holding element 5. The deflecting device 11 comprises a sliding element 12 and a rotating element 13 arranged on the sliding cover 2. The rotating element 13 rotates about a bearing bushing 14 fixed to the sliding cover 2. The rotating element 13 comprises two driving lever arms 16 and two holding element lever arms 17. The driving lever arms 16 are not connected fixedly to the sliding element 12; the contact instead is created only when the sliding element 12 is displaced. The driving lever arms 16 rest against a driving surface 18 of the sliding element 12. The holding element lever arms 17 transmit the rotational movement of the rotating element 13 to the holding elements 5. To release the holding element 5, the rotating element 13 has to be rotated by a release angle 19, wherein the angle of a rotation resulting from an inadvertent actuation of the actuating element 6 is configured such that it is smaller than the release angle 19. To return the holding element 5 from the released position to the holding position, an energy storage arrangement 15 configured as a leg spring is arranged between the sliding cover 2 and the two holding elements 5. The sliding cover 2 comprises guide devices 20, for example rollers and/or gliders, for sliding the sliding cover 2 in a guided manner in the guide rail 4. A stop 21 is on the sliding cover 2 to limit movement of the sliding element 12. Guide elements 22 are arranged on the sliding cover 2 for guiding the deflecting device 11 and/or the holding elements 5.

Figure 4:
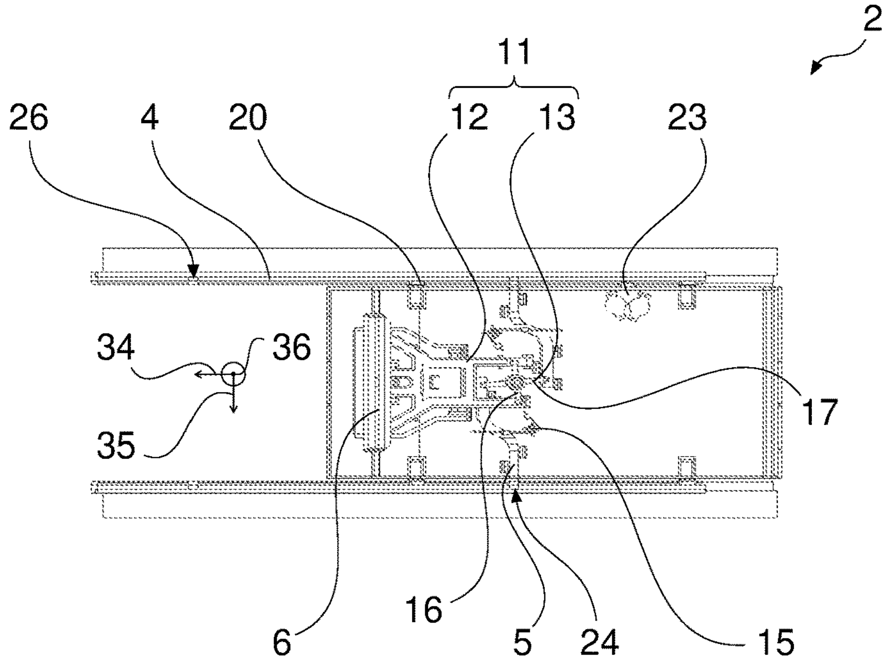
FIG. 4 is a plan view of the sliding cover of FIG. 3 in the open state.

FIG. 4 is a plan view onto the sliding cover 2 of FIG. 3 in the open state. The guide rails 4 are arranged on both sides and in each case comprise two blocking arrangements 24. The blocking arrangement 24 is configured as a catch. The holding elements 5 pass through the sliding cover 2 and engage in the respective blocking arrangement 24. The guide device 20 of the sliding cover 2 is a roller that can move in the guide rail 4 of the center console 1. FIG. 4 also shows a rotary brake 23 arranged on the sliding cover 2 and the guide rail 4.

Figure 5:
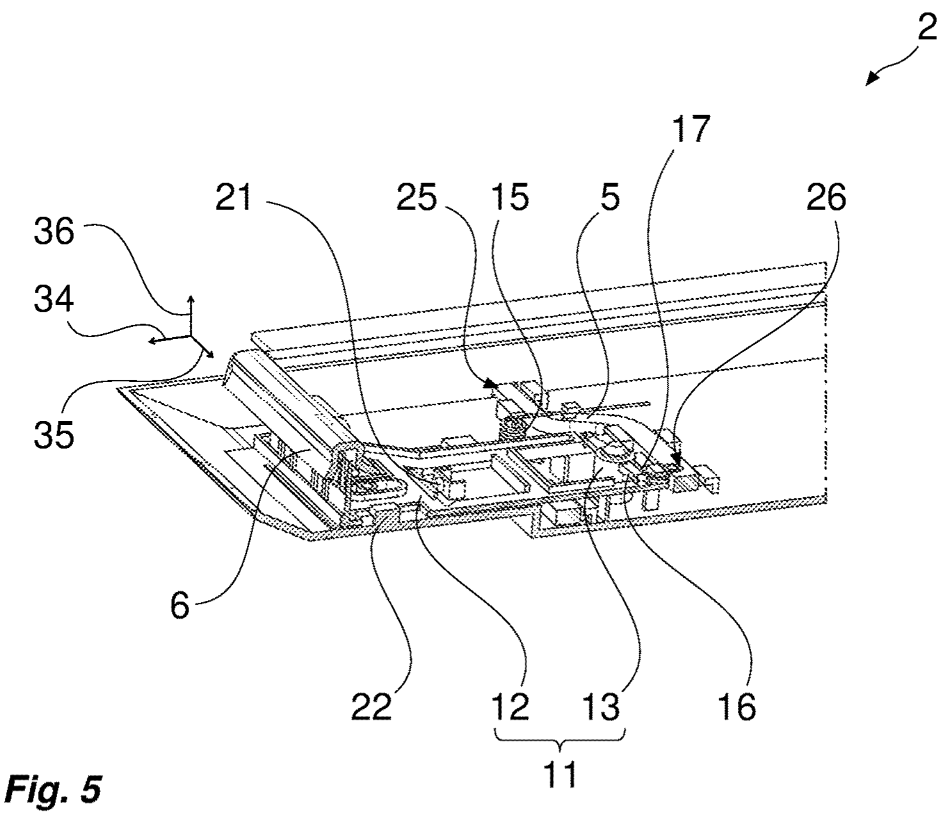
FIG. 5 is a sectional view of the sliding cover of FIG. 3 and FIG. 4.

FIG. 5 is a sectional view of the sliding cover 2, 3 of FIG. 3 and FIG. 4. The actuating element 6 is connected fixedly to the sliding element 12. The actuating element 6 preferably is configured to be actuated relative to the sliding element 12, for example, mounted in a pivotable manner. Alternatively or additionally, the actuating element 6 is configured only to be displaced axially (here along the x-axis 34). The driving lever arms 16 rest against the driving surface 18. The holding element lever arms 17 do not have a fixed connection to the holding elements 5, but instead engage in a depression 26 of the respective holding element 5.

Figure 6:
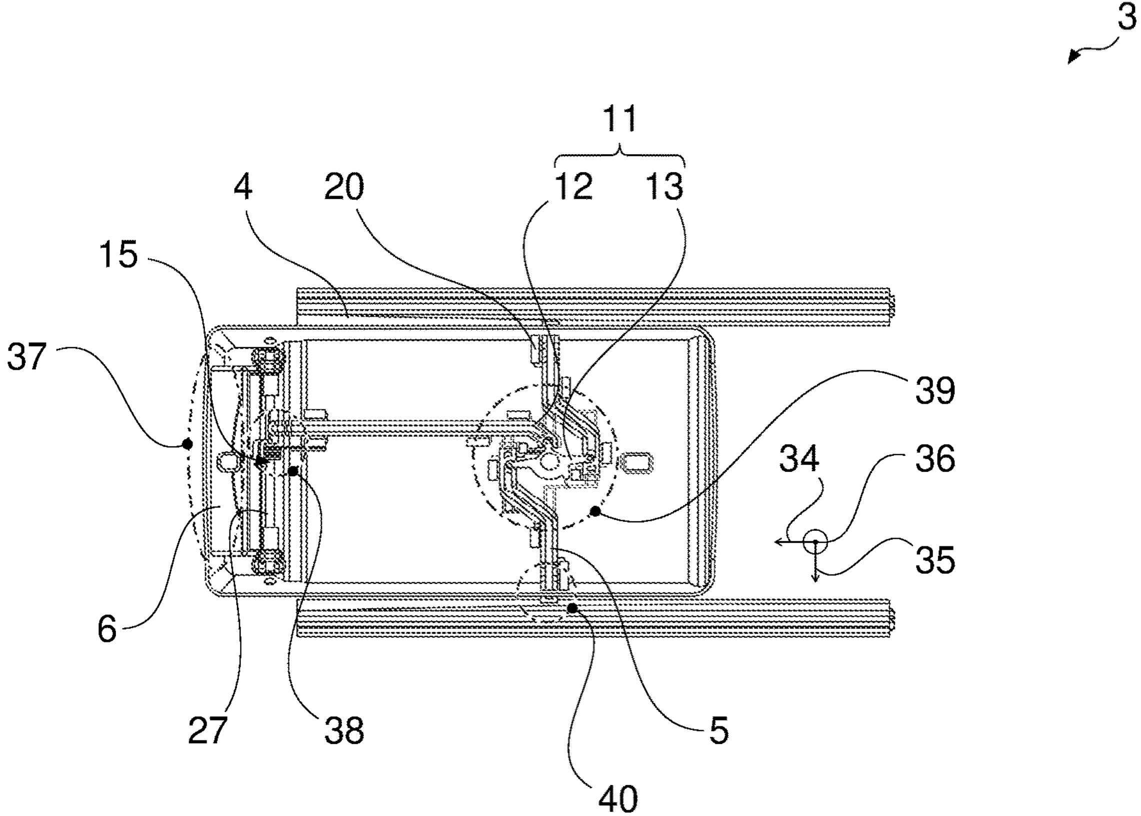
FIG. 6 is a plan view of a second sliding cover according to a second embodiment with the upper part hidden.

FIG. 6 is a plan view onto a second sliding cover 3 of a second embodiment with the upper part 31 hidden. The actuating element 6 is a rotary button. The actuating element 6 rotates about an axis of rotation 27 that is aligned along the y-axis 35 of the motor vehicle 32 (see FIG. 11). The actuating element 6 comprises a driver 28 38 in FIG. 8, by means of which the sliding element 12 can be displaced translationally. The actuating element 6 is not connected fixedly to the sliding element 1. Rather, the contact is created only as a result of a rotation of the actuating element 6. The sliding element 12 is connected to the rotating element 13 via a ball head 29 (compare FIG. 9). To return the holding element 5 from the released position to the holding position, an energy storage arrangement 15, configured as a leg spring, is arranged between the first sliding cover 2, 3 and the actuating element 6.

Figure 7:
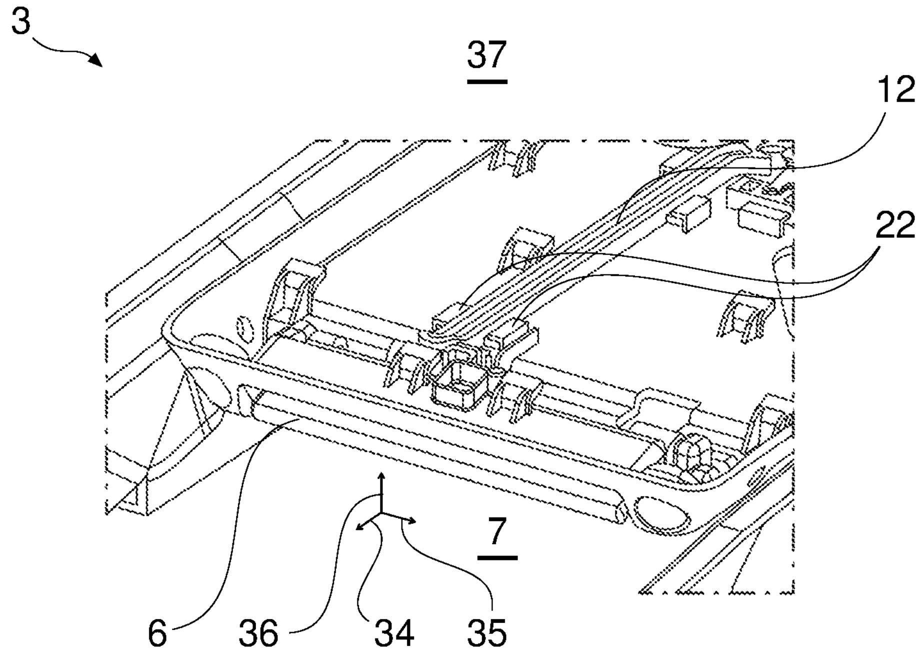
FIG. 7 is a view of a first detail of the actuating element of a (second) sliding cover according to FIG. 6.

FIG. 7 shows a detail view of the actuating element 6 of a (second) sliding cover 3 according to the second embodiment example in FIG. 6. The actuating element 6 is a rotary button and, from the point of view of a user sitting on a vehicle seat 41 (see FIG. 11), is arranged on the underside, i.e. in this example on the storage compartment-side, of the sliding cover 3.

Figure 8:
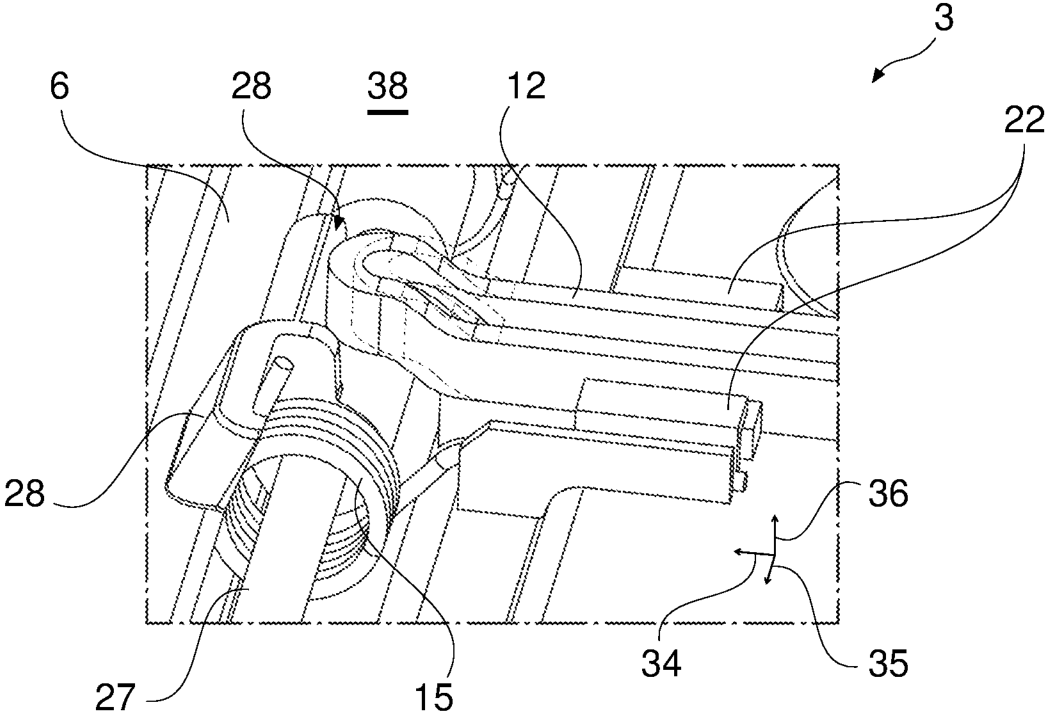
FIG. 8 is a view of a second detail of the actuating element of a (second) sliding cover according to FIG. 6.

FIG. 8 shows a further detail of a second sliding cover 3 according to the embodiment example in FIG. 6. The actuating element 6 is not connected fixedly to the sliding element 12; the contact instead is created only when the actuating element 6 is rotated. The actuating element 6 is configured to pivot about the axis of rotation 27 and moves the sliding element 12 by means of a driver 28. An energy storage arrangement 15 in the form of a leg spring is arranged between the sliding cover 3 and the actuating element 6. The axis of rotation 27 is arranged to pass through the spring body of the energy storage arrangement 15.

Figure 9:
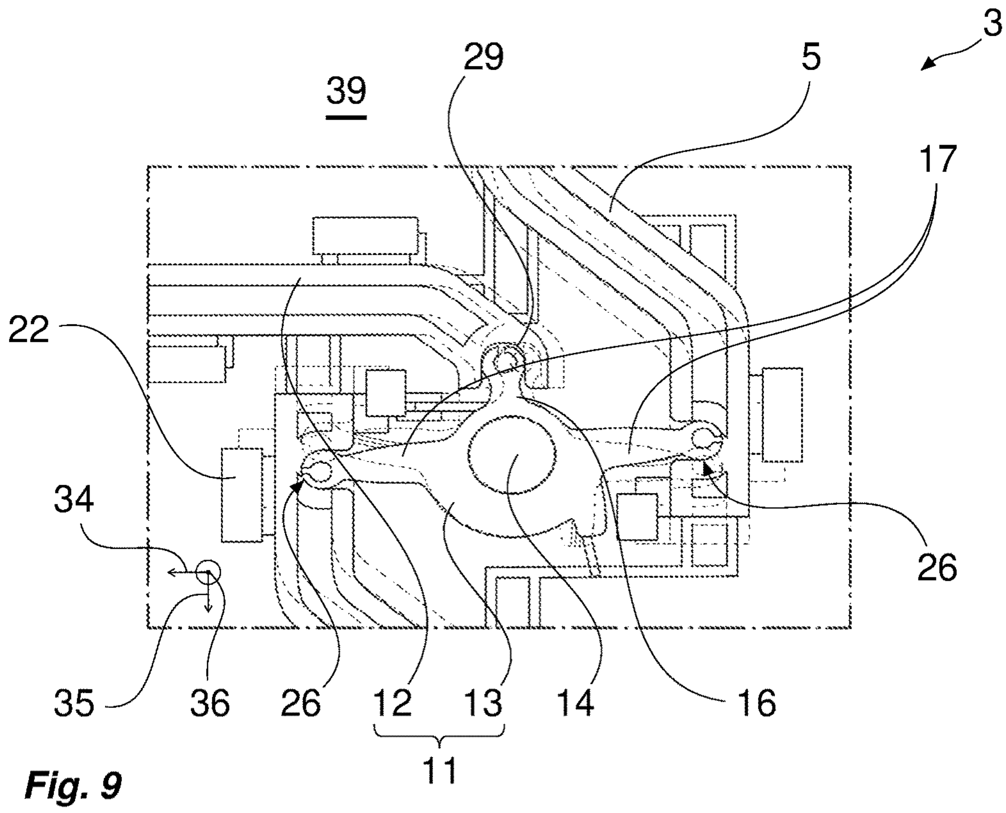
FIG. 9 is a view of a third detail of the actuating element of a (second) sliding cover according to FIG. 6.

FIG. 9 shows a further detail view of a sliding cover 3 according to the second embodiment in FIG. 6. The sliding element 12 is connected to the rotating element 13 via a ball head 29. The rotating element 13 is configured to rotate about a bearing bushing 14 and comprises two driving lever arms 16. The shown holding element 5 has depressions 26 in which the driving lever arms 16 engage. When the rotating element 13 rotates, the rotational movement is converted to the release movement 10. Guide elements 22 for guiding the holding elements 5 are arranged on the sliding cover 3.

Figure 10:
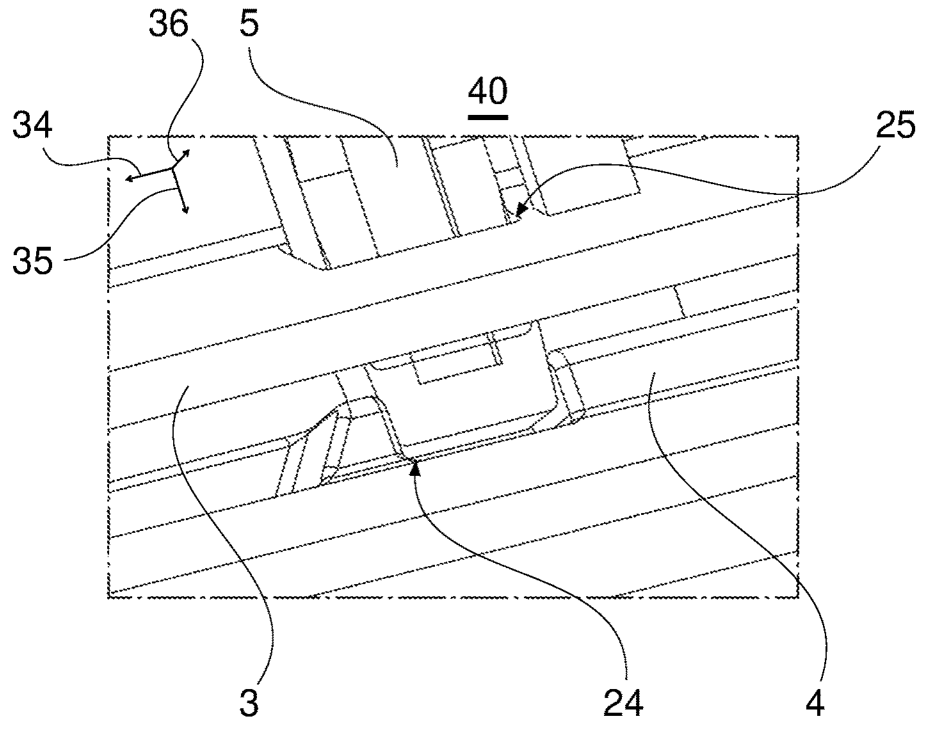
FIG. 10 is a view of a fourth detail of the actuating element of a (second) sliding cover according to FIG. 6.

FIG. 10 shows a further detail view of a sliding cover 3 according to the second embodiment in FIG. 6. The holding element 5 is guided through an opening 25 of the sliding cover 3; the holding element 5 therefore passes through the sliding cover 3. The holding element 5 is configured here to be a blocking arrangement 24 in the guide rail 4, and the blocking arrangement 24 is configured here as a catch. The holding element 5 passes through the sliding cover 3 and engages in the blocking arrangement 24.

FIG. 11 shows a motor vehicle 32 in a schematic plan view with a drive train 42. The motor vehicle 32 comprises a transport compartment 44, for example a passenger compartment, approximately in the center of its chassis 43, and four drive wheels 45 for propulsion of the motor vehicle 32 on and to the side of the chassis 43. In the rear, the vehicle comprises a traction machine 46 (in this case solely optionally aligned longitudinally, i.e. with the shaft parallel to the x-axis 34 of the motor vehicle 32), as well as a transmission 47 and/or a differential 48. Two vehicle seats 41 and a steering wheel 49 are indicated here in the transport compartment 44 (solely as an example), between which a center console 1 is arranged as a center armrest 33. In this example, the center console 1 comprises a (for example first) sliding cover 2.

The invention claimed is:

1. A sliding cover for a center console of a motor vehicle, comprising:
- a guide device configured for sliding the sliding cover in a guided manner;
- a holding element configured for holding the sliding cover in one position;
- an actuating element configured to release the holding element by a release movement; and
- a deflecting device configured to transmit the release movement between the actuating element and the holding element, wherein the deflecting device comprises a sliding element and a rotating element arranged on the sliding cover,
- wherein the rotating element is configured to be rotated from a first position to a second position via the release movement,
- wherein the rotating element, in the first position, does not contact the sliding element, and, during the release movement towards the second position, contacts the sliding element, and
- wherein the sliding cover is configured to be slid in a guided manner by the guide device when the holding element is released.

2. The sliding cover of claim 1, wherein the sliding cover is configured to be displaced translationally by the guide device.

3. The sliding cover of claim 1, wherein the sliding direction of the sliding cover and the movement direction of the actuating element are the same.

4. The sliding cover of claim 1, wherein the sliding cover has two sliding directions and the actuating element has an actuating direction that is oriented in the same direction as the respective sliding directions.

5. The sliding cover of claim 1, further comprising at least one energy storage arrangement for returning the holding element from the released position to the holding position.

6. The sliding cover of claim 1, wherein the actuating element is configured to be rotatable for releasing the holding element.

7. A center console for a motor vehicle comprising at least one storage compartment with at least one guide rail and the least one sliding cover of claim 1, wherein;

at least one of the sliding covers is configured to be guided in at least one of the guide rails by the guide device, and the at least one storage compartment is configured to be closed at least partly by at least one of the sliding covers.

8. The center console of claim 7, further comprising a blocking arrangement for the respective holding element and configured on at least two positions of the at least one guide rail.

9. The center console of claim 8, further comprising at least one rotary brake arranged on the at least one sliding cover and/or the at least one guide rail for slowing down the at least one sliding cover.

10. The center console of claim 7 further comprising a first sliding cover configured to at least partly close the at least one storage compartment, and a second sliding cover configured as a center armrest and to at least partly close a storage compartment.

11. The center console of claim 7, wherein at least one energy storage arrangement is arranged between the sliding cover and the center console and is pretensioned in the actuated state for opening or closing the sliding cover.

12. The sliding cover of claim 1, wherein the rotating element comprises a first lever arm, a second lever arm, and a third lever arm, wherein the holding element comprises a first holding block and a second holding block, wherein the first lever arm is fixedly connected to the first holding block, the second lever arm is fixedly connected to the second holding block, and the third lever arm is configured to contact the sliding element during the release movement, and wherein the first lever arm and the second lever arm are on opposite sides of the rotating element relative to the third lever arm.

13. The sliding cover of claim 1, wherein the release movement causes a translational displacement of the sliding element in a direction perpendicular to a translational displacement of the holding element, and wherein a rotation of the rotating element transmits the translational displacement of the sliding element to the translational displacement of the holding element.

14. The sliding cover of claim 1, wherein the holding element is arranged in a same plane as the sliding element and the rotating element.

* * * * *